United States Patent
Ellis et al.

(10) Patent No.: US 8,275,895 B1
(45) Date of Patent: Sep. 25, 2012

(54) SYSTEMS AND METHODS FOR ESTABLISHING A TRUSTED DYNAMIC HOST CONFIGURATION PROTOCOL CONNECTION

(75) Inventors: Stephen K. Ellis, Saratoga Springs, UT (US); Kody S. Brown, Salt Lake City, UT (US)

(73) Assignee: Crimson Corporation, Dover, DE (US)

( * ) Notice: Subject to any disclaimer, the term of this patent is extended or adjusted under 35 U.S.C. 154(b) by 499 days.

(21) Appl. No.: 11/614,873

(22) Filed: Dec. 21, 2006

(51) Int. Cl.
*G06F 15/16* (2006.01)
*G06F 9/00* (2006.01)

(52) U.S. Cl. .................... 709/229; 709/727; 713/2

(58) Field of Classification Search ............ None
See application file for complete search history.

(56) References Cited

U.S. PATENT DOCUMENTS

| | | | |
|---|---|---|---|
| 5,442,633 A | 8/1995 | Perkins et al. | |
| 5,598,536 A | 1/1997 | Slaughter, III et al. | |
| 5,684,951 A | 11/1997 | Goldman et al. | |
| 5,884,024 A | 3/1999 | Lim et al. | |
| 6,427,170 B1 * | 7/2002 | Sitaraman et al. | 709/226 |
| 6,856,240 B1 * | 2/2005 | Elswick et al. | 340/7.22 |
| 7,035,917 B2 | 4/2006 | Yamasita | |
| 7,051,087 B1 * | 5/2006 | Bahl et al. | 709/220 |
| 2003/0163341 A1 | 8/2003 | Banerjee et al. | |
| 2004/0120260 A1 * | 6/2004 | Bernier et al. | 370/252 |
| 2004/0193867 A1 * | 9/2004 | Zimmer et al. | 713/2 |
| 2005/0071480 A1 * | 3/2005 | Chu et al. | 709/228 |
| 2005/0148326 A1 * | 7/2005 | Nogawa et al. | 455/420 |

OTHER PUBLICATIONS

Droms, "Dynamic Host Configuration Protocol", Mar. 1997, retrieved from http://tools.ietf.org/pdf/rfc2131.pdf on May 13, 2011.*
Droms et al., "Dynamic Host Configuration Protocol for IPv6" retrieved from http://www.ietf.org/rfc/rfc3315.txt on May 13, 2010.*

* cited by examiner

*Primary Examiner* — Wen-Tai Lin
(74) *Attorney, Agent, or Firm* — Austin Rapp & Hardman

(57) ABSTRACT

A method for establishing trusted communication between a client and a server is described. The method is implemented by a computer system. A response is received from a first server. An internet protocol address of the first server is compared with at least one internet protocol address within a list. The response is validated if the internet protocol address of the first server is included within the list. Trusted communication is established between the client and the first server. The trusted communication includes assigning an internet protocol address provided by the response to the client.

15 Claims, 11 Drawing Sheets

SYSTEMS AND METHODS FOR ESTABLISHING A TRUSTED DYNAMIC HOST CONFIGURATION PROTOCOL CONNECTION

TECHNICAL FIELD

The present invention relates generally to computers and computer-related technology. More specifically, the present invention relates to establishing a trusted connection between a client and a server in a dynamic host configuration protocol environment.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Computers or computing devices often require an internet protocol (IP) address before they can participate on a computer network. An IP address is an identifier for the computer or computing device on a TCP/IP network. Networks using the TCP/IP protocol route messages based on the IP address of the destination. An IP address may be assigned to each computer on the network at random as long as each IP address is unique. The dynamic host configuration protocol (DHCP) is a protocol for assigning a dynamic IP address to computers or computing devices on the network. With dynamic addressing, a computer or computing device may have a different IP address each time it connects to the network. In the context of computer networking, DHCP is a client-server networking protocol. A DHCP server provides the dynamic IP address to the DHCP client requesting to participate on the network.

When multiple DHCP servers are present on the network, the client will request to use the IP address provided by the first server to respond. If an unauthorized DHCP server is on the network, it is possible that the unauthorized DHCP server may respond first to the client with an incorrect IP address. If the client utilizes this incorrect IP address, the client may be prevented from participating on the network. The unauthorized DHCP server (referred to as a rogue server) may assume control of the client, at which point the client becomes a security risk because it may not be able to connect to the network to obtain software updates. The rogue server may also send Trojans and Viruses to the incorrect IP address that disrupts the efficiency and productivity of the client. Other undesirable events may also result from this type of situation involving a rogue DHCP server.

As shown from the above discussion, there is a need for systems and methods that will improve the ability to establish a trusted connection between clients and servers. Improved systems and methods may enable a system administrator to manage which servers on the network the client may communicate with. Benefits may be realized by providing increased functionality to establish a trusted connection between clients and servers.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
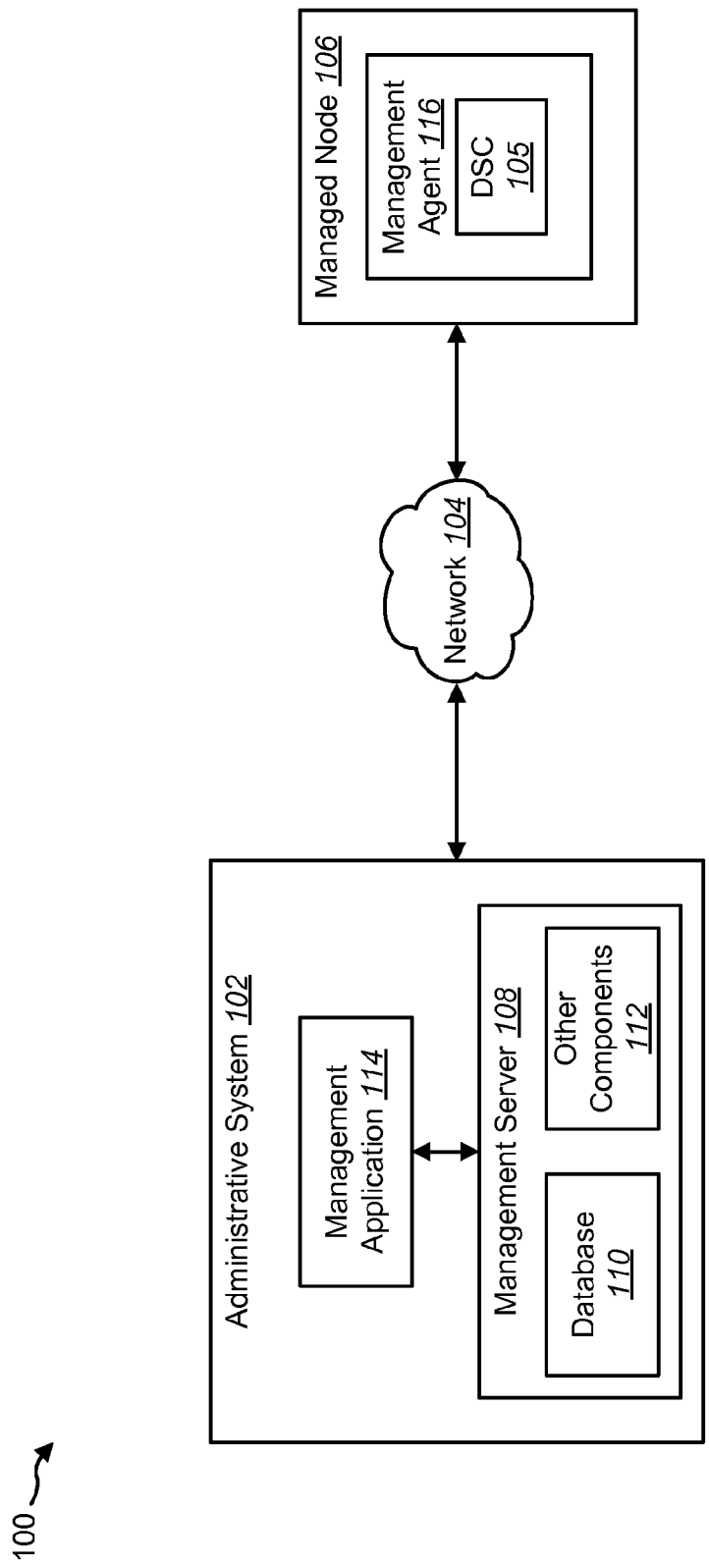
FIG. 1 illustrates an exemplary system in which some embodiments may be practiced.

A method for establishing trusted communication between a client and a server is described. The method is implemented by a computer system. A response is received from a first server. An internet protocol address of the first server is compared with at least one internet protocol address within a list. The response is validated if the internet protocol address of the first server is included within the list. Trusted communication is established between the client and the first server. The trusted communication includes assigning an internet protocol address provided by the response to the client.

In some embodiments, the response may be rejected if the internet protocol address of the first server is not included within the list. Systems and methods may also wait for a second response from a second server. The second response may be received from the second server, and an internet protocol address of the second server may be compared with one or more than one internet protocol addresses within the list. Some embodiments may validate the second response if the internet protocol address of the second server is included within the list.

The response from the first server may be cached if the internet protocol address of the first server is not included within the list. The cached response may further be validated if no additional servers are available to provide a response.

A computer system that is configured to establish trusted communication between a client and a server is also described. The computer system includes a processor and memory in electronic communication with the processor. Instructions are stored in the memory and are executable to establish trusted communication between a client and a server. A response is received from a first server. An internet protocol address of the first server is compared with at least one internet protocol address within a list. The response is validated if the internet protocol address of the first server is included within the list. Trusted communication is established between the client and the first server. The trusted communication includes assigning an internet protocol address provided by the response to the client.

A client configured to communicate with a server over a network is also described. The client includes a network driver configured to communicate with a server on the network, and a dynamic host configuration protocol secure connection component configured to receive communications from the network driver. The client also includes a predetermined list of parameters configured to identify the server communicating with the client.

The predetermined list may be configured to include the internet protocol address of the server or a plurality of servers on the network. Additionally, the dynamic host configuration protocol secure connection component may be configured to compare the internet protocol address of the server with the internet protocol addresses included in the predetermined list. The client may further configured to communicate with a server implementing dynamic host configuration protocol communications. The client may also be configured to communicate with a server implementing preboot execution communications.

A computer-readable medium comprising executable instructions for validating a response is also described. A response is received from a first server. An internet protocol address of the first server is compared with at least one internet protocol address within a list. The response is validated if the internet protocol address of the first server is included within the list. Trusted communication is established between the client and the first server. The trusted communication includes assigning an internet protocol address provided by the response to the client.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As discussed above, computers or computing devices often require an internet protocol (IP) address before they can participate on a computer network. The dynamic host configuration protocol (DHCP) is a protocol for assigning a dynamic IP address to computers or computing devices on the network. A DHCP server provides the dynamic IP address to the DHCP client requesting to participate on the network. For example, a client sends a request, commonly known as a DHCPDISCOVER, to locate an available DHCP server on the network. A DHCP server responds to the client with a DHCPOFFER that provides a possible IP address the client may use to identify itself on the network. The client returns a DHCPREQUEST to the DHCP server requesting the assignment of the IP address provided in the DHCPOFFER. The DHCP server acknowledges this request by returning a DHCPACK and assigning the IP address to the client.

When multiple servers are present on the network, the client will request to use the IP address provided by the first server to respond to the DHCPDISCOVER. Rogue DHCP servers may respond first to the client with an incorrect IP address. If the client utilizes this incorrect IP address, the client may be prevented from participating on the network. The rogue server may assume control of the client and the client becomes a severe security risk because it cannot connect to the network to obtain software updates. The rogue server may also send Trojans and Viruses to the incorrect IP address that disrupts the efficiency and productivity of the client. Other undesirable events may also result from this type of situation involving a rogue DHCP server.

Currently, the only method available to prevent rogue servers from interfering with the connectivity of clients to the network is to disable the rogue DHCP server and reset the client's network identification. However, tracking down and disabling a rogue DHCP server costs time and resources.

As shown from the above discussion, there is a need for systems and methods that will improve the ability to establish a trusted connection between clients and servers. Improved systems and methods may enable a system administrator to manage which servers on the network the client may communicate with. The systems and methods herein improve the ability to establish a trusted connection between clients and servers. A trusted connection or a secure connection as used herein means that the communication is approved and/or authorized. Communication with a rogue server (where the communication was not approved and/or authorized) would not be a trusted or secure connection as used herein.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 may include a database 110 of information. The management server 108 may also include various other components 112 that are configured to perform tasks such as scheduling, handling alerts, and so forth.

The administrative system 102 also includes a management application 114. The management application 114 may be used to perform various tasks related to the management of the computer network 104, such as IP address assigning, remote control, software distribution, software license monitoring, operating system imaging and migration, IT asset management, problem resolution, and so forth. As part of performing these tasks, the management application 114 may access the management server 108 and query the management server 108 for information.

To enable a user of the administrative system 102 to perform management tasks via the management application 114, the managed node 106 includes a management agent 116. The management agent 116 performs management-related tasks in response to requests from the management application 114.

As indicated above, one of the tasks performed by the administrative system 102 may be assigning an IP address to the managed node 106. The assignment of an IP address may comply with the dynamic host configuration protocol (DHCP) that is commonly known in the art. When the managed node 106 is assigned an IP address, the managed node 106 may participate on the network 104. To facilitate the assignment of a correct IP address, the managed node 106 includes a DHCP secure connection (DSC) component 105. The DSC 105 prevents an unapproved administrative system from assigning an incorrect IP address to the managed node 106. An incorrect IP address may allow an unapproved administrative system to hijack the managed node 106 or prevent the managed node 106 from entering its native network environment. Additional details about the operation of the DSC 105 will be provided below.

Figure 2:
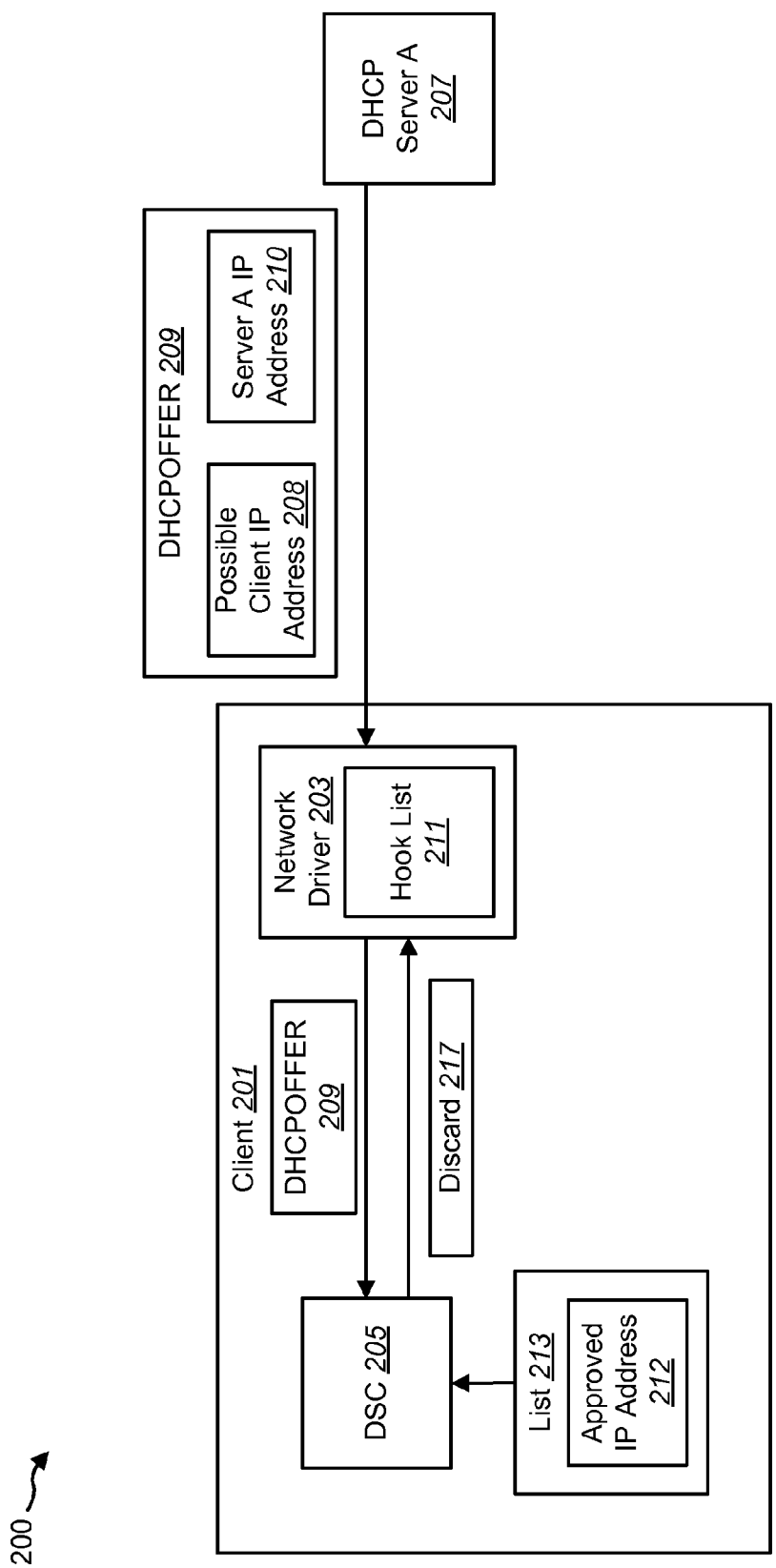
FIG. 2 is a block diagram illustrating one embodiment of an environment utilizing the dynamic host configuration protocol with an unapproved server.

FIG. 2 is a block diagram illustrating one embodiment of a DHCP client-server environment 200 with an unapproved DHCP server A 207. DHCP is an Internet protocol for automating the configuration of computers that use TCP/IP. In one embodiment, DHCP can be used to assign an IP address to a client 201 to deliver TCP/IP stack configuration parameters such as the subnet mask and default router, and to provide other configurations such as the addresses for printer, time, and new servers.

The client 201 may include a standard personal computer, a workstation, a laptop computer, a managed node, and so forth. In one embodiment, the client 201 communicates with the DHCP server A 207 across a network connection. The DHCP server A 207 provides configuration parameters specific to the client 201. The client 201 may request information required for the client 201 to participate on the network. In one embodiment, the client 201 may request an IP address. The IP address is a unique number that identifies the client 201 on the network.

In one embodiment, the client 201 broadcasts a DHCPDISCOVER packet (not shown) on the network in order to locate a DHCP server. The DHCPDISCOVER packet may include a request for an IP address in order for the client 201 to participate on the network. The DHCP server A 207 may receive the DHCPDISCOVER and returns a response packet to the client 201, also known as a DHCPOFFER 209. The DHCPOFFER 209 may include a possible client IP address 208 that the client 201 may use to participate on the network. Additionally, the DHCPOFFER 209 includes information regarding the DHCP server A 207. For example, the DHCPOFFER 209 may include the server IP address 210 assigned to the DHCP server A 207.

The client 201 includes a network driver 203 which is designed to allow the client 201 to communicate over the network. In one embodiment, the network driver 203 receives the DHCPOFFER 209 from the DHCP server A 207. The network driver 203 may include a hook list 211, which is a programmable function that calls for the execution of unique applications under certain circumstances. For example, each instance the network driver 203 receives a DHCP packet, such as the DHCPOFFER 209, the hook list 211 calls for the execution of a DSC 205. After the hook list 211 triggers the execution of the DSC 205, the network driver 203 communicates the DHCPOFFER 209 to the DSC 205.

The DSC 205 is a component that runs on any operating system installed on the client 201, and prevents the client 201 from being assigned an IP address from an unapproved DHCP server. The client 201 includes a list 213 that contains the IP addresses of approved servers 212. As illustrated, the list 213 includes the IP address 212 for an approved DHCP server. The DSC 205 accesses the list 213 and compares the server IP address 210 included in the DHCPOFFER 209 with the IP addresses of the approved DHCP servers 212 included in the list 213. If the server IP address 210 is not included in the list 213, the DSC 205 returns a discard command 217 to the network driver 203. The discard command 217 notifies the network driver 203 to invalidate and ignore the DHCPOFFER 209 received from the DHCP server A 207. For example, the DSC 205 accesses the list 213 and compares the server IP address 210 of the DHCP server A 207 with the approved IP addresses 212 within the list 213. In the depicted embodiment, the server IP address 210 of the DHCP server A 207 is not on the list 213. The DSC 205 sends the discard command 217 to the network driver 203 and the DHCPOFFER 209 sent from the DHCP server A 207 is not validated.

Figure 3:
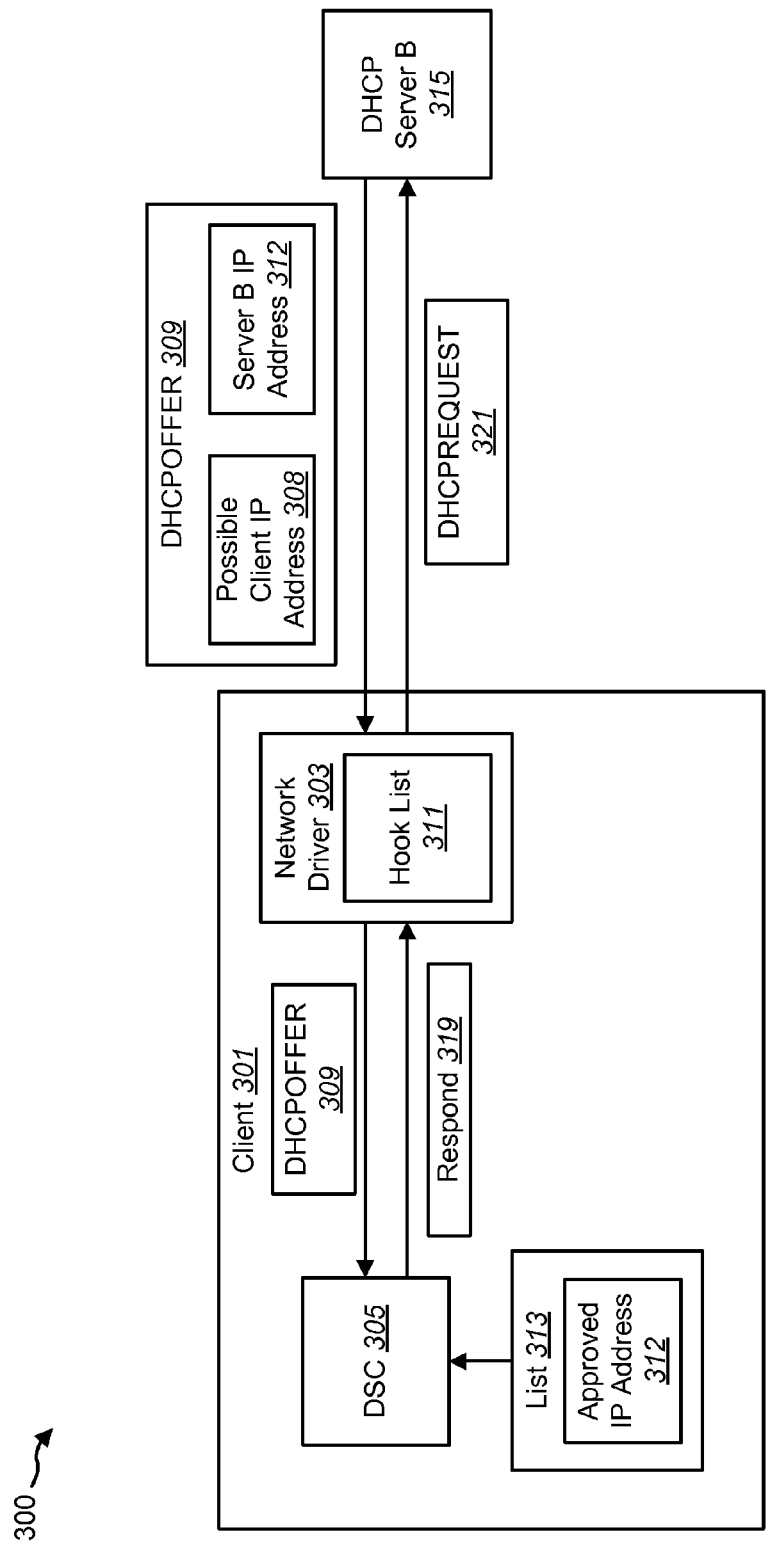
FIG. 3 is a block diagram illustrating an additional embodiment of an environment utilizing the dynamic host configuration protocol with an approved server.

FIG. 3 is a block diagram illustrating a DHCP client-server environment 300 with an approved DHCP server B 315. As previously explained with reference to FIG. 2, the DHCP server B 315 sends the DHCPOFFER 309 to the client 301 in response to a DHCPDISCOVER. The network driver 303 receives the DHCPOFFER 309. The hook list 311 recognizes the DHCPOFFER 309 as a DHCP packet and proceeds to activate the DSC 305. The network driver 303 forwards the DHCPOFFER 309 to the DSC 305. The DSC 305 accesses the list 313 and compares the server IP address 312 of the DHCP server B 315 within the DHCPOFFER 309 with the IP addresses 312 within the list 313. In the illustrated embodiment, the list 313 contains the server IP address 312 of the DHCP server B 315. Subsequently, the DSC 305 returns a respond command 319 to the network driver 303. The network driver 303 receives the respond command 319 and sends a DHCPREQUEST 321 to the DHCP server B 315. The DHCPREQUEST 321 may include a request to assign the client IP address 308 initially included in the DHCPOFFER 309 to the client 301 to enable the client 301 to participate on the network.

Figure 4:
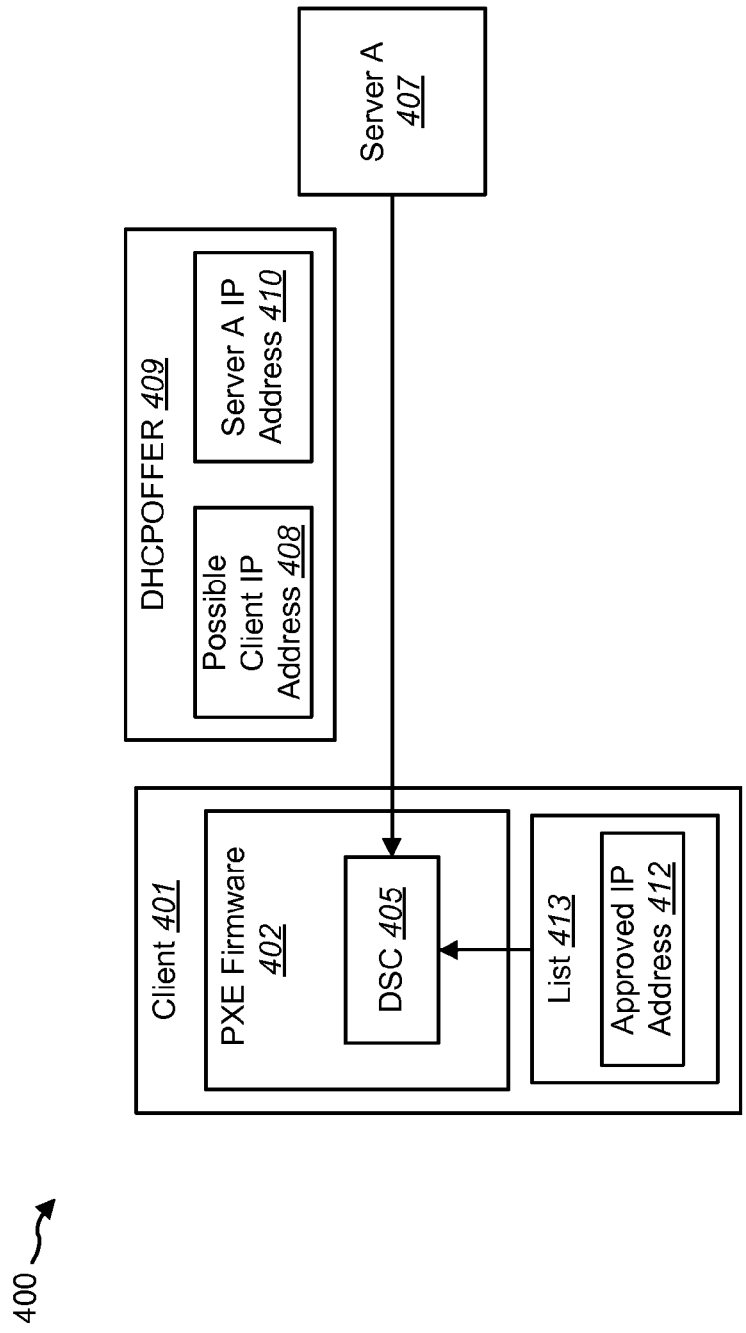
FIG. 4 is a block diagram illustrating one embodiment of a preboot execution environment.

FIG. 4 is a block diagram illustrating a preboot execution environment (PXE) 400 that utilizes the present systems and methods. As illustrated, a client 401 includes PXE firmware 402, which enables the client 401 to boot from a server on the network prior to booting the operating system on the local hard drive of the client 401. The PXE firmware 402 performs a predefined DHCP connection at boot. For example, the PXE enabled client 401 may boot from the server A 407 and then broadcast a DHCPDISCOVER (not shown) to the server A 407. The server A 407 sends a DHCPOFFER 409 to the client 401 in response to the DHCPDISCOVER. The DHCPOFFER 409 may include a possible client IP address 408 that the client 401 may use to participate on the network.

As shown, the PXE firmware 402 may be modified to include the DSC 405. The DSC 405 receives the DHCPOFFER 409 and compares the server IP address 410 of the server A 407 included within the DHCPOFFER 409 with the IP addresses 412 included in the list 413. The list 413 contains the IP addresses 412 of the approved servers. If the IP address 410 of the server A 407 is not included in the list 413, the DSC 405 will invalidate the DCHPOFFER 409 from the server A 407. The DSC 405 prevents the unapproved server A 407 from hijacking the client 401 during the preboot execution by invalidating the DHCPOFFER 409 with an incorrect client IP address 408.

Figure 5:
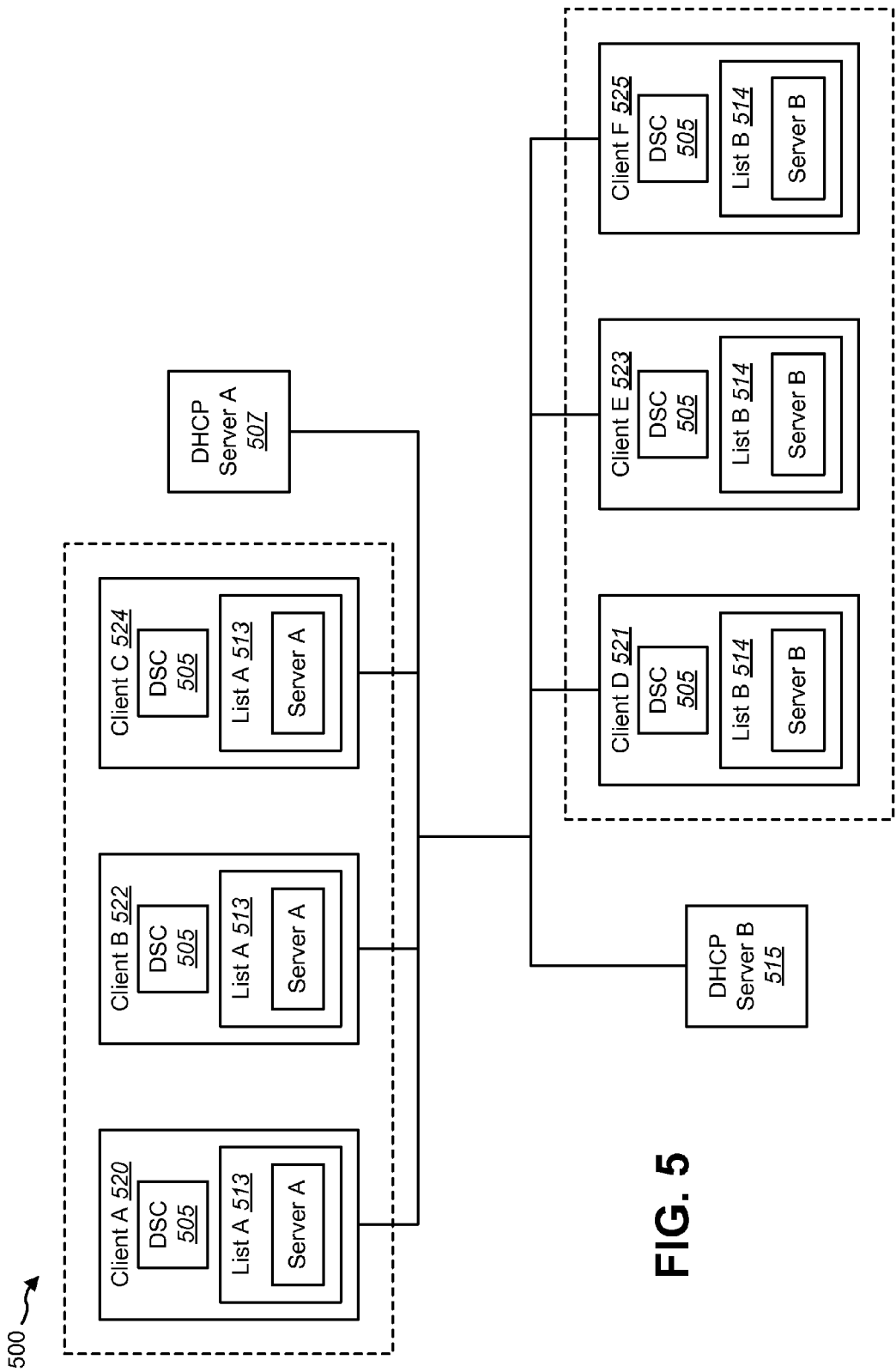
FIG. 5 is a block diagram illustrating one embodiment of the dynamic host configuration protocol environment incorporating multiple servers.

FIG. 5 is a block diagram illustrating an environment 500 with a plurality of clients 520-525 and multiple DHCP servers 507 and 515. In one embodiment, the multiple DHCP servers, such as DHCP server A 507 and DHCP server B 515, are on the same network in order to provide IP addresses to the plurality of clients 520-525. As shown, each client within the plurality of clients 520-525 includes a DSC 505. The DSC 505 prevents the clients within the plurality of clients 520-525 from being assigned an IP address from an unapproved server.

As illustrated, the DHCP server A 507 and the DHCP server B 515 may communicate with each client within the plurality of clients 520-525. For example, a client A 520 may broadcast a DHCPDISCOVER (not shown) in order to locate a DHCP server on the network. The DHCP server A 507 and the DHCP server B 515 may each receive the DHCPDISCOVER and communicate a DHCPOFFER (not shown) to the client A 520. Each DHCPOFFER includes the IP address of the server that sent the DHCPOFFER. The DSC 505 included in the client A 520 receives the DHCPOFFER from each server and compares the IP address of the server within the DHCPOFFER with the IP addresses within an approved list A 513. The list A 513 contains a list of the IP addresses of servers that the client A 520 may accept DHCPOFFERS from. As shown, the list A 513 includes the IP address of the DHCP server A 507 and does not contain the IP address of the DHCP server B 515. The DSC 505 validates the DHCPOFFER sent from the DHCP server A 507 and invalidates the DHCPOFFER sent from the DHCP server B 515. The DSC 505 included in the client B 522 and the client C 524 may also validate a DHCPOFFER sent from the DHCP server A 507. The client B 522 and the client C 524 each include the list A 513 that contains the IP address of the DHCP server A 507.

Similarly, the DHCP server A 507 and the DHCP server B 515 may communicate with client D 521, client E 523 and client F 525. For example, the client D 521 may broadcast a DHCPDISCOVER and the DHCP servers A and B 507 and 515 may send a DHCPOFFER to the client D 521. The client D 521 includes the DSC 505, which receives the DHCPOFFER and compares the IP address of the server included with the DHCPOFFER with the IP addresses of approved servers within the list B 514. In one embodiment, the list B 514 includes the IP address of the DHCP server B 515 and does not include the IP address of the DHCP server A 507. The DSC 505 validates the DHCPOFFER sent from the DHCP server B 515 and invalidates the DHCPOFFER sent from the DHCP server A 507. The DHCP server B 515 communicates with the client E 523 and the client F 525 in a similar manner.

The environment 500 illustrated in FIG. 5 facilitates a system to incorporate multiple DHCP servers on a single network. The DSC 505 prevents an erroneous server from assigning incorrect IP addresses to clients on the network as described above.

Figure 6:
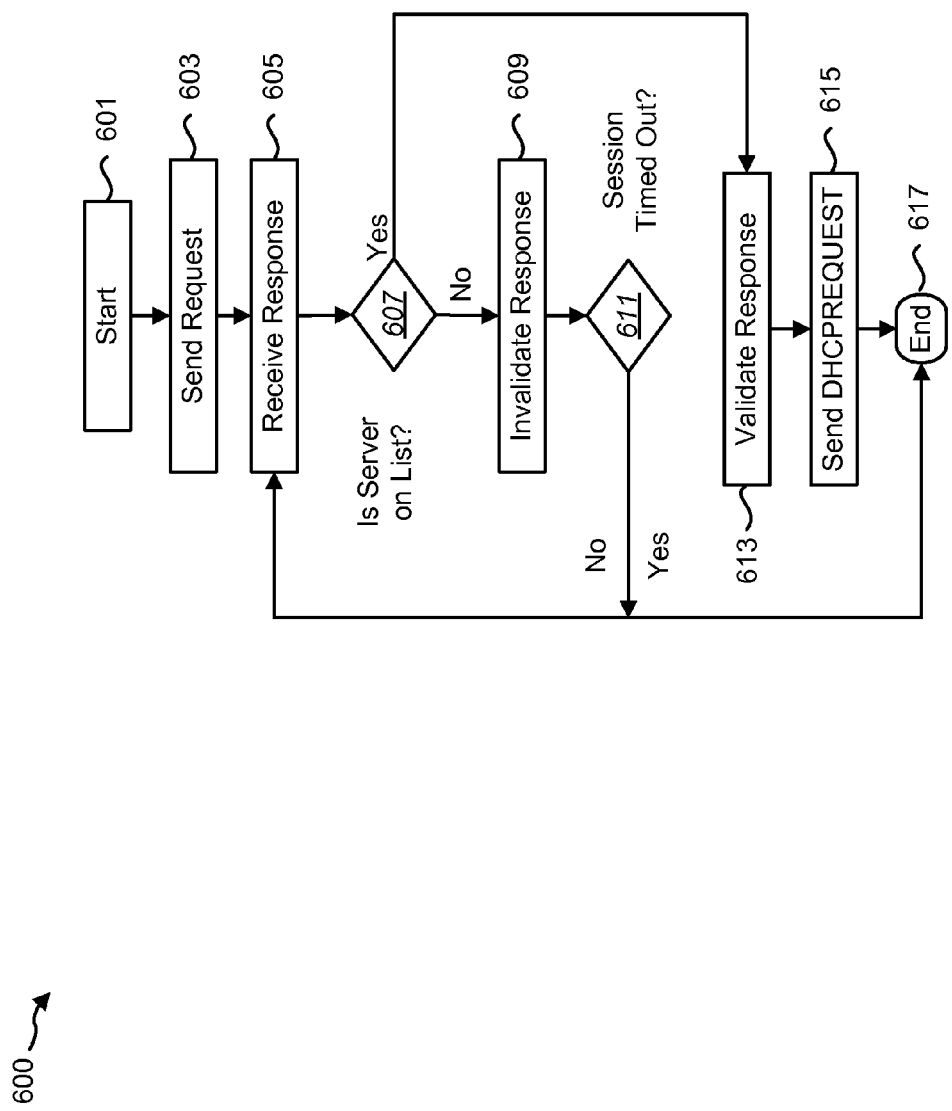
FIG. 6 is a flow diagram illustrating one embodiment of a response validating method.

FIG. 6 is a flow chart illustrating one embodiment of a response validating method 600 in accordance with the present systems and methods. The method 600 allows the DSC 205 to receive a response, such as the DCHPOFFER 209, from a server on the network and validate the response if the server is a pre-approved server. The method 600 starts 601 and the client 201 sends 603 a request, such as the DHCPDISCOVER. The request may include a request for an IP address in order to enable the client 201 to participate on the network. The DSC 205 receives 605 a response to the request, such as the DHCPOFFER 209. The response may be sent from one of the servers within the plurality of servers on the network.

After the DSC 205 receives 605 the response, the method 600 continues and the DSC 205 determines 607 if the IP address of the server that sent the response is included in the approved list 213. In one embodiment, the DSC 205 evaluates the IP address of the server that is included in the response. The DSC 205 compares the IP address of the server with the IP addresses included in the list 213. If the DSC 205 determines 607 that the IP address of the server is not included in the list 213, the DSC 205 invalidates 609 the response. In one embodiment, the DSC 205 forwards a discard command 217 to the network driver 203 and the network driver 203 does not establish a connection with the server. After the response is invalidated 609, the method 600 continues and determines if the communication session between the client 201 and the network has timed out 611. If the session has not timed out, the method 600 continues to receive 605 responses from any additional servers on the network. Alternatively, if the communication session between the client 201 and the network has timed out, the method 600 ends 617.

If the DSC 205 determines 607 that the IP address of the server that sent the response is included in the list 213, the method 600 continues and the DSC 205 validates 613 the response. In one embodiment, the DSC 205 communicates a respond command 319 to the network driver 203. The network driver 203 sends 615 a DHCPREQUEST 321 to the server that provided the validated response. The DHCPREQUEST 321 may include a request for the client 201 to be assigned the IP address offered in the DHCPOFFER 209 in order for the client 201 to participate on the network.

Figure 7:
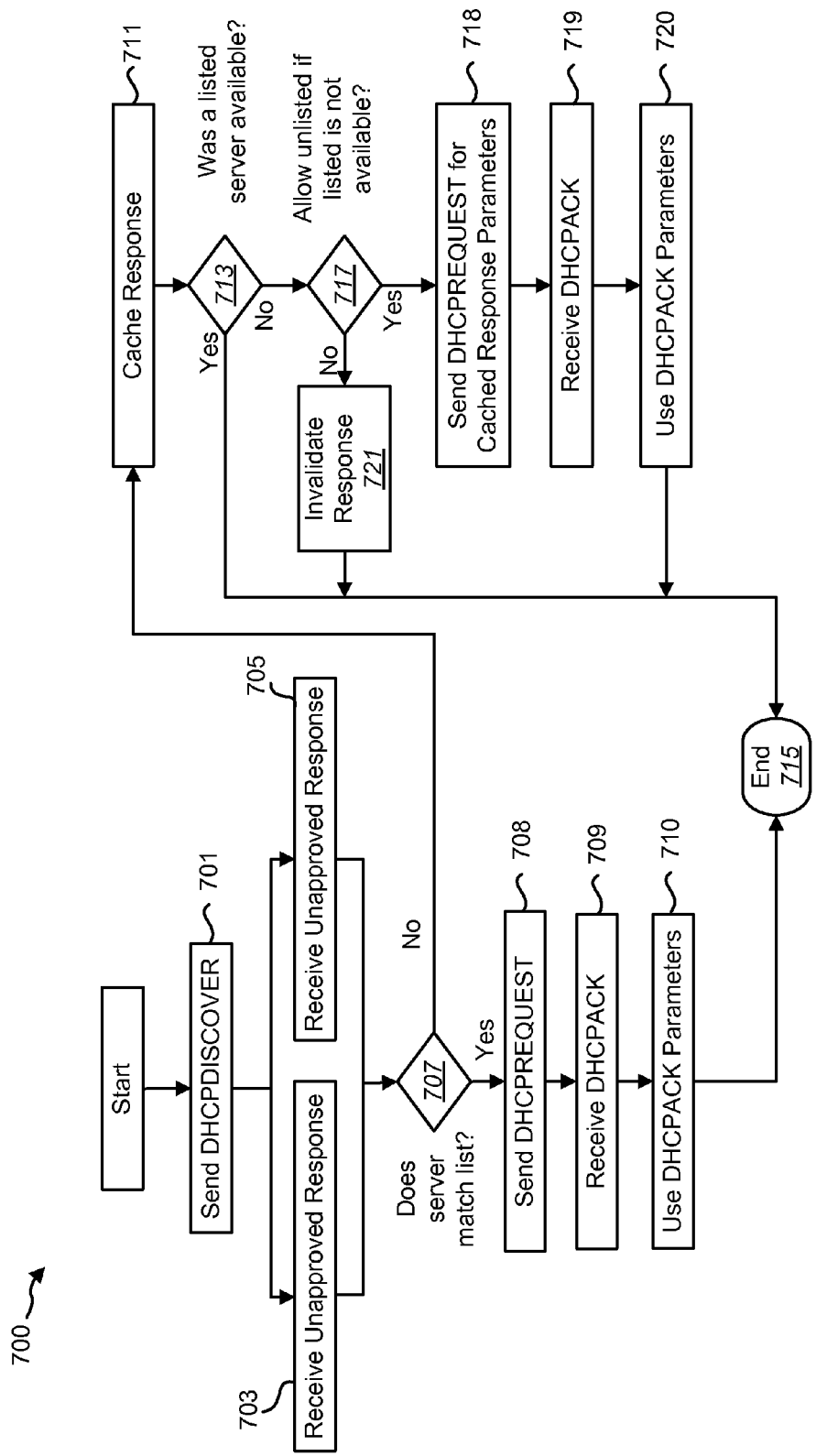
FIG. 7 is a flow diagram illustrating an additional embodiment of the response validating method.

FIG. 7 is another embodiment of a response validating method 700 in accordance with the present systems and methods. The method 700 may allow the client 201 to use an IP address received from a non-approved server. The method 700 begins by the client 201 sending 701 a request, such as a DHCPDISCOVER. In one embodiment, the request may include a request for an IP address in order for the client 201 to participate on the network. Multiple servers may exist on the network and each server may receive the request. For example, a non-approved server, such as the DHCP server A 207 in FIG. 2, may receive the request and provide 703 a response. Similarly, an approved server, such as the DHCP server B 315 of FIG. 3, may also receive the request and provide 705 a response. The response may be a DHCPOFFER 209 that includes configuration parameters, such as an IP address, that the client 201 may use to identify itself on the network.

As explained previously in relation to FIG. 6, the DSC 205 may receive the response from the server that responds first. Once the DSC driver 205 receives the response, the method 700 continues and the DSC 205 compares 707 the IP address of the server that sent the first response with the list 213 of approved servers. For example, the DHCP server A 207 may be the first server on the network to send a response to the client's 201 request. The DSC 205 compares 707 the IP address of the DHCP server A 207 with the IP addresses included in the authorized list 213. The IP address of the DHCP server A 207 is included in the response. If the IP address of the DHCP server A 207 matches an IP address within the list 213, the client 201 sends 708 a DHCPREQUEST for the assignment of the IP address included in the DHCPOFFER. The server acknowledges the DHCPREQUEST by sending a DHCPACK to the client 201. The client 201 receives 709 the DHCPACK that includes the IP address the client 201 may use 710 to identify itself on the network.

However, if the IP address of the server is not matched 707 with an IP address within the list 213, the response from the unapproved server is cached 713. In one embodiment, the response is cached 713 in the memory of the client 201. Once the response is cached 713, the method 700 continues and the DSC 205 determines 713 if a server listed within the list 213 is available to provide a response to the client 201. If an approved server is available, but did not provide a response, the method 700 ends 715.

Alternatively, if an approved server is not available 713 to provide a response, the method continues 700 and determines 717 if the response from the unapproved server is allowed. If the response from the unapproved server is allowed, the client 201 sends 718 a DHCPREQUEST to the unapproved server for the IP address provided in the cached DHCPOFFER. The client receives 719 a DHCPACK from the unapproved server that includes the IP address the client may use 720 to identify itself on the network. The user may be given the opportunity to select whether or not the client is to obtain an IP address from an unapproved server. For example, during start up, the client computing device may pause during startup if none of the pre-approved servers are available and notify the user of the unapproved server offering configuration parameters to the client 201. At this point, the user may select to request the configuration parameters offered by the unapproved server. Alternatively, the user may enter manual configuration parameters or cancel the network connection completely.

If unapproved servers are not allowed 717 to provide configuration parameters, the response is invalidated 721. In one embodiment, the DSC 205 communicates a discard command 217 to the network driver 203. After the response from the unapproved server is invalidated 721, the method 700 ends 715 and the client 201 does not establish a connection with the server.

Figure 8:
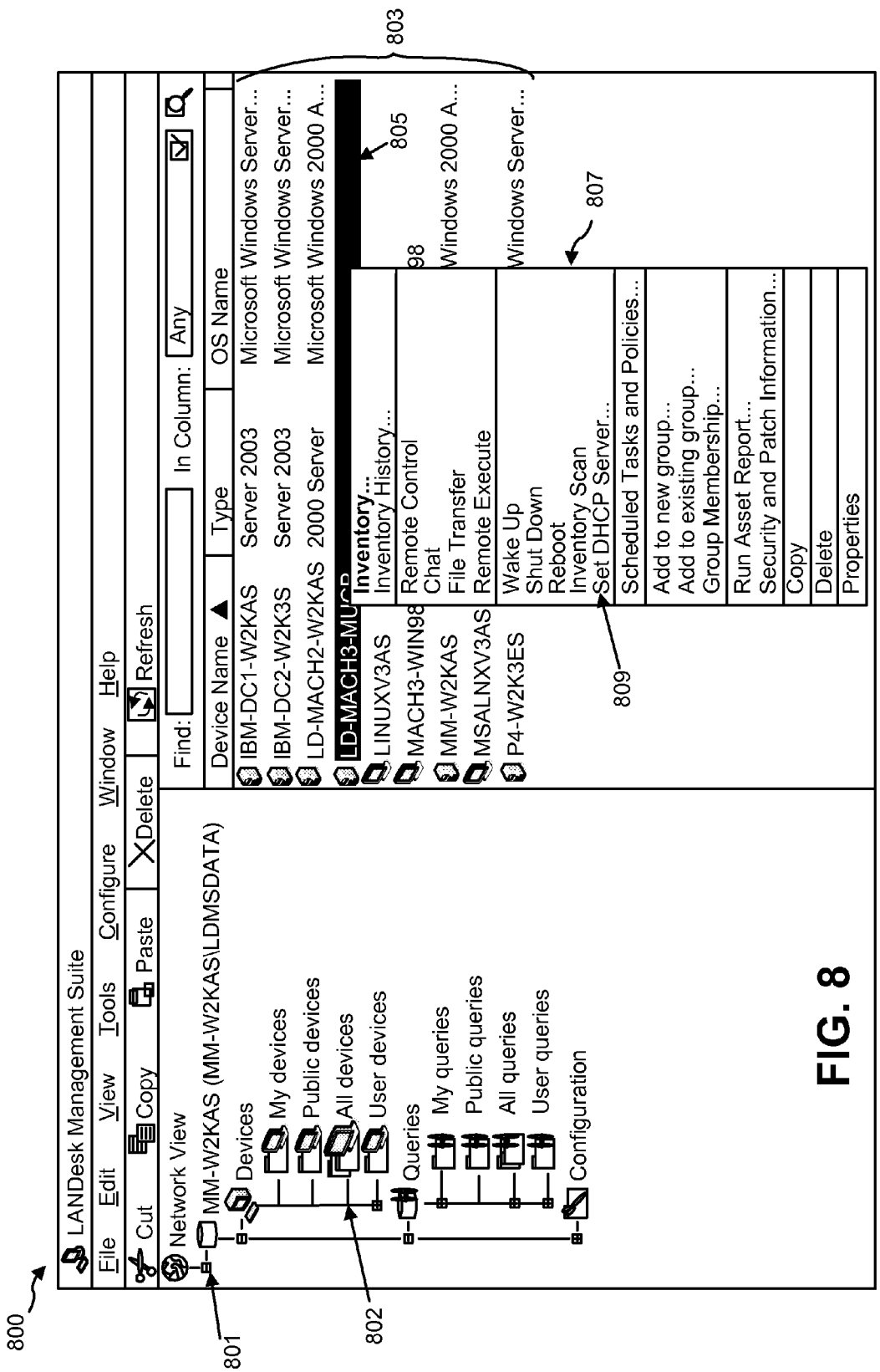
FIG. 8 illustrates one embodiment of a user interface that incorporates the present systems and methods.

FIG. 8 is one embodiment of a user interface 800. The user interface 800 may facilitate a system administrator to manage the functionality of the DSC 205 in accordance with the present systems and methods.

The interface 800 allows the user to view a particular network 801 and the devices associated with the network 801. In one embodiment, the user may select to view all the devices 802 associated with the network 801. The interface 800 illustrates all the devices on the network 801. In one embodiment, all the devices may include a plurality of devices 803 that may be clients 201 as explained with reference to FIG. 2.

As illustrated, the user selects a single client 805 within the plurality of clients 803. A command menu 807 relating to the single client 805 is displayed to the user. The command menu 807 allows the user to select certain preferences or parameters relating to the selected client 805. In one embodiment, the user may select the preference to set DHCP server 809. The set DHCP server preference 809 facilitates the user to select a particular DHCP server that may communicate with the client 805. The selected DHCP server may communicate an IP address to the client 805 in order for the client 805 to participate on the network 801. In one embodiment, the user selects the set DHCP server preference 809 and provides the IP address of the DHCP server. The IP address of the DHCP server is added to the list 213 of approved servers contained within the client 805. The DSC 205 within the client 805 may access the list 213 and validate communications from the DHCP server.

Figure 9:
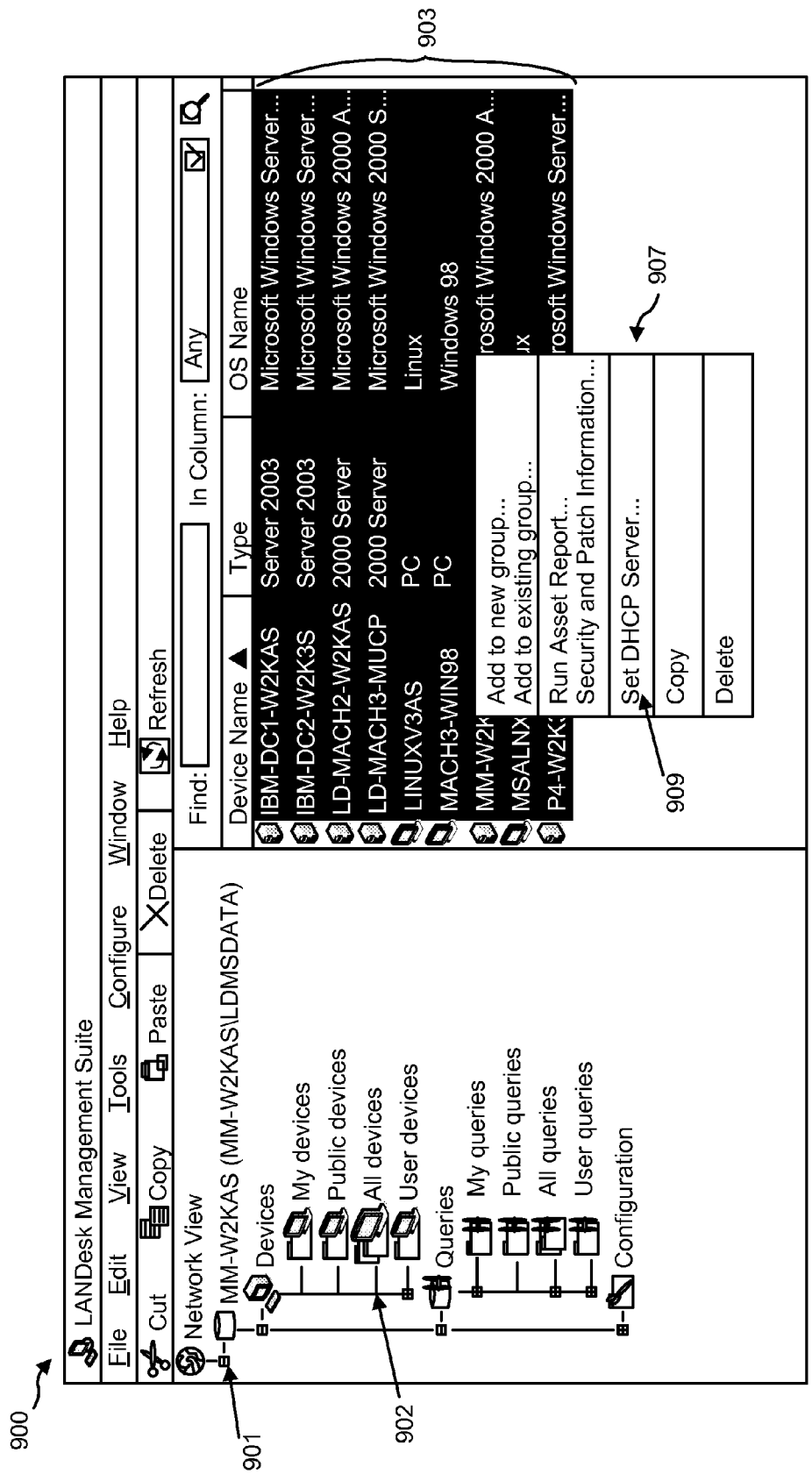
FIG. 9 illustrates an additional embodiment of the user interface.

FIG. 9 is further embodiment of the user interface 900 as explained with reference to FIG. 8. The user interface 900 includes a network 901 and a selection for the user to view all the devices 902 on the network 901. The interface 900 illustrates the plurality of devices 903 associated with the network 901. In one embodiment, the user may select each device within the plurality of devices 903. Each device within the plurality of devices 903 may include a client 201. The command menu 907 pertains to each device within the plurality 903. The user may select the set DHCP server preference 909, which facilitates the user to select a DHCP server that may communicate with each device within the plurality 903. For example, the user may select the DHCP server preference 909 and provide the IP address of the DHCP server. The IP address of the server is added to the list 213 stored on each individual device within the plurality of devices 903. The DSC 205 within each device may access the list 213 and validate communications sent from the DHCP server to each device within the plurality of devices 903.

Figure 10:
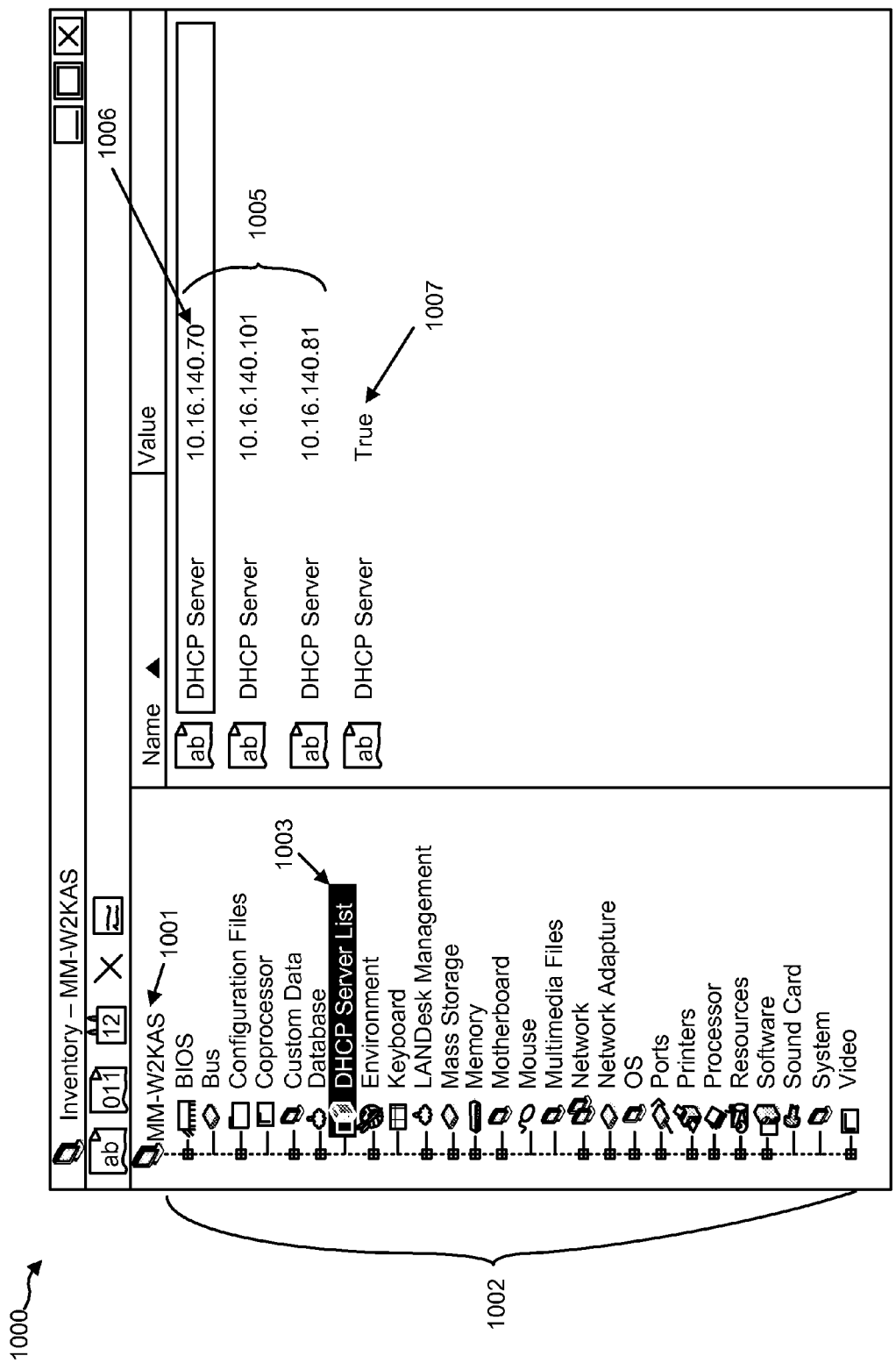
FIG. 10 illustrates the user interface that facilitates a user to manage multiple servers in accordance with the present systems and methods.

FIG. 10 is one embodiment of a user interface 1000 to facilitate a user to view the DHCP servers associated with a particular client 1001. The interface 1000 displays a plurality of options 1002 relating to the client 1001. For example, the user may select to view the DHCP server list option 1003. The DHCP server list option 1003 displays the plurality of DHCP servers 1005 allowed to assign an IP address to the client 1001. As illustrated, the plurality of DHCP servers 1005 displays the name of the server as well as the IP address of each particular server within the plurality of DHCP servers 1005. The user may select a single DHCP server 1006 within the plurality of DHCP servers 1005 and alter the settings pertaining to that server. For example, the user may select the single server 1006 and alter the IP address of the server in order to allow a different DHCP server to communicate with the client 1001.

The interface 1000 further facilitates the user to disable the network driver 203 within the client 1001. A disable NIC on failure option 1007 may be set to a true value. When the option 1007 is set to a true value the network driver 203 of the client 1001 is disabled from using the IP address when there are no approved servers communicating with the client 1001. For example, if a DHCP server not included within the plurality of DHCP servers 1005 provides an IP address to the client 1001, and the option 1007 is set to a true value, the DSC 205 will not validate the IP address and the client 1001 will not participate on the network. Alternatively, if the option 1007 is set to a false value, the client 1001 may use the IP address sent from a DHCP server that is not part of the plurality of DHCP servers 1005.

Figure 11:
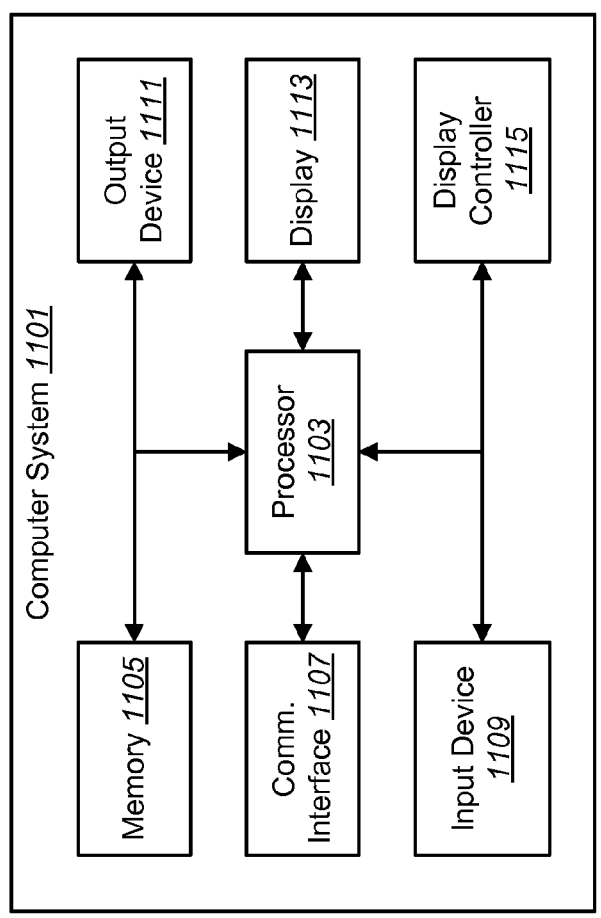
FIG. 11 is a block diagram illustrating the major hardware components typically utilized in a computer system.

FIG. 11 is a block diagram illustrating the major hardware components typically utilized in a computer system 1101. The illustrated components may be located within the same physical structure or in separate housings or structures.

The computer system 1101 includes a processor 1103 and memory 1105. The processor 1103 controls the operation of the computer system 1101 and may be embodied as a microprocessor, a microcontroller, a digital signal processor (DSP) or other device known in the art. The processor 1103 typically performs logical and arithmetic operations based on program instructions stored within the memory 1105.

As used herein, the term memory 1105 is broadly defined as any electronic component capable of storing electronic information, and may be embodied as read only memory (ROM), random access memory (RAM), magnetic disk storage media, optical storage media, flash memory devices in RAM, on-board memory included with the processor 1103, EPROM memory, EEPROM memory, registers, etc. The memory 1105 typically stores program instructions and other types of data. The program instructions may be executed by the processor 1103 to implement some or all of the methods disclosed herein.

The computer system 1101 typically also includes one or more communication interfaces 1107 for communicating with other electronic devices. The communication interfaces 1107 may be based on wired communication technology, wireless communication technology, or both. Examples of different types of communication interfaces 1107 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1101 typically also includes one or more input devices 1109 and one or more output devices 1111. Examples of different kinds of input devices 1109 include a keyboard, mouse, microphone, remote control device, button, joystick, trackball, touchpad, lightpen, etc. Examples of different kinds of output devices 1111 include a speaker, printer, etc. One specific type of output device which is typically included in a computer system is a display device 1113. Display devices 1113 used with embodiments disclosed herein may utilize any suitable image projection technology, such as a cathode ray tube (CRT), liquid crystal display (LCD), light-emitting diode (LED), gas plasma, electroluminescence, or the like. A display controller 1115 may also be provided, for converting data stored in the memory 1105 into text, graphics, and/or moving images (as appropriate) shown on the display device 1113.

Of course, FIG. 11 illustrates only one possible configuration of a computer system 1101. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for establishing trusted communication between a client and a server, the method being implemented by a computer system, the method comprising:
receiving a response from a first server;
comparing an internet protocol address of the first server with at least one internet protocol address within a list;
caching the response from the first server if the internet protocol address of the first server is not included within the list;
validating the response if the internet protocol address of the first server is included within the list;
establishing trusted communication between the client and the first server when the internet protocol address of the first server is included within the list, wherein establishing the trusted communication includes a request to assign the client an internet protocol address provided by the response to the client; and waiting a period of time for a response from an additional server that has an internet protocol address included within the list if the internet protocol address of the first server is not included within the list, wherein, after waiting the period of time, if no response is received from the additional server, prompting a user to accept or refuse connection to the first server, wherein if the user accepts connection, validating the cached response from the first server and establishing communication between the client and the first server, wherein the establishing communication includes a request to assign the client the internet protocol address provided by the response to the client.

2. The method of claim 1, further comprising rejecting the response if the internet protocol address of the first server is not included within the list.

3. The method of claim 2, further comprising receiving a second response from the additional server and comparing an internet protocol address of the additional server with the one or more than one internet protocol addresses within the list.

4. The method of claim 3, further comprising validating the second response if the internet protocol address of the additional server is included within the list.

5. A computer system that is configured to establish trusted communication between a client and a server, the computer system comprising:
   a processor;
   memory in electronic communication with the processor;
   instructions stored in the memory, the instructions being executable to:
      receive a response from a first server;
      compare an internet protocol address of the first server with one or more than one internet protocol addresses within a list;
      cache the response from the first server if the internet protocol address of the first server is not included in the list;
      validate the response if the internet protocol address of the first server is included within the list;
      establish trusted communication between the client and the first server when the internet protocol address of the first server is included within the list, wherein establishing the trusted communication includes a request to assign the client an internet protocol address provided by the response to the client; and
      wait a period of time for a response from an additional server that has an internet protocol address included within the list if the internet protocol address of the first server is not included within the list, wherein, after waiting the period of time, if no response is received from the additional server, prompting a user to accept or refuse connection to the first server,
      wherein if the user accepts connection, validating the cached response from the first server and establishing communication between the client and the first server, wherein the establishing communication includes a request to assign the client the internet protocol address provided by the response to the client.

6. The computer system of claim 5, wherein the instructions stored in the memory are further executable to reject the response if the internet protocol address of the first server is not included within the list.

7. The computer system of claim 5, wherein the instructions stored in the memory are further executable to receive a second response from the additional server and compare an internet protocol address of the additional server with the one or more than one internet protocol addresses within the list.

8. The computer system of claim 7, wherein the instructions stored in the memory are further executable to validate the second response if the internet protocol address of the additional server is included within the list.

9. A client configured to communicate with a server over a network, the client comprising:
   a network driver configured to communicate with a server on the network;
   a dynamic host configuration protocol secure connection component configured to receive communications from the network driver;
   a predetermined list of parameters configured to identify the server communicating with the client; and
   a memory to cache a communication from the server if an internet protocol address associated with the server is not included in the predetermined list of parameters, wherein if the internet protocol address of the server is not included within the list, the client waits a period of time for a response from an additional server that has an internet protocol address included within the list, wherein, after waiting the period of time, if no response is received from the additional server, the client prompts a user to accept or refuse connection to the server,
   wherein if the user accepts connection, the client validates the cached communication from the server and establishes communication between the client and the server, wherein the establishing of communication includes a request to assign the client the internet protocol address provided by the communication to the client.

10. The client of claim 9, wherein the predetermined list is configured to include the internet protocol address of the server or a plurality of servers on the network.

11. The client of claim 9, wherein the dynamic host configuration protocol secure connection component is configured to compare the internet protocol address of the server with the internet protocol addresses included in the predetermined list.

12. The client of claim 9, further configured to communicate with a server implementing dynamic host configuration protocol communications.

13. The client of claim 9, further configured to communicate with a server implementing preboot execution communications.

14. A non-transitory processor-readable storage medium comprising executable instructions for validating a response at a client, the instructions being executable to:
   receive a response from a first server;
   compare an internet protocol address of the first server with one or more than one internet protocol addresses within a list;
   cache the response from the first server if the internet protocol address of the first server is not included in the list;
   validate the response if the internet protocol address of the first server is included within the list;
   establish trusted communication between the client and the first server when the internet protocol address of the first server is included within the list, wherein establishing the trusted communication includes a request to assign the client an internet protocol address provided by the response to the client;
   wait for a second response from a second server that has an internet protocol address included within the list if the response from the first server is not validated;

receive the second response from the second server and compare an internet protocol address of the second server with the one or more than one internet protocol addresses within the list; and validate the second response if the internet protocol address of the second server is included within the list, wherein, after waiting a period of time, if no response is received from the second server, prompt a user to accept or refuse connection to the first server, wherein if the user accepts connection, validate the cached response from the first server and establish communication between the client and the first server, wherein the establishing communication includes a request to assign the client the internet protocol address provided by the response to the client.

15. The client of claim 9, wherein the predetermined list is configured to include the internet protocol address of the server or a plurality of servers on the network, wherein the dynamic host configuration protocol secure connection component is configured to compare the internet protocol address of the server with the internet protocol addresses included in the predetermined list, and wherein the client is further configured to communicate with a server implementing preboot execution communications.

* * * * *